No. 771,061. Patented September 27, 1904.

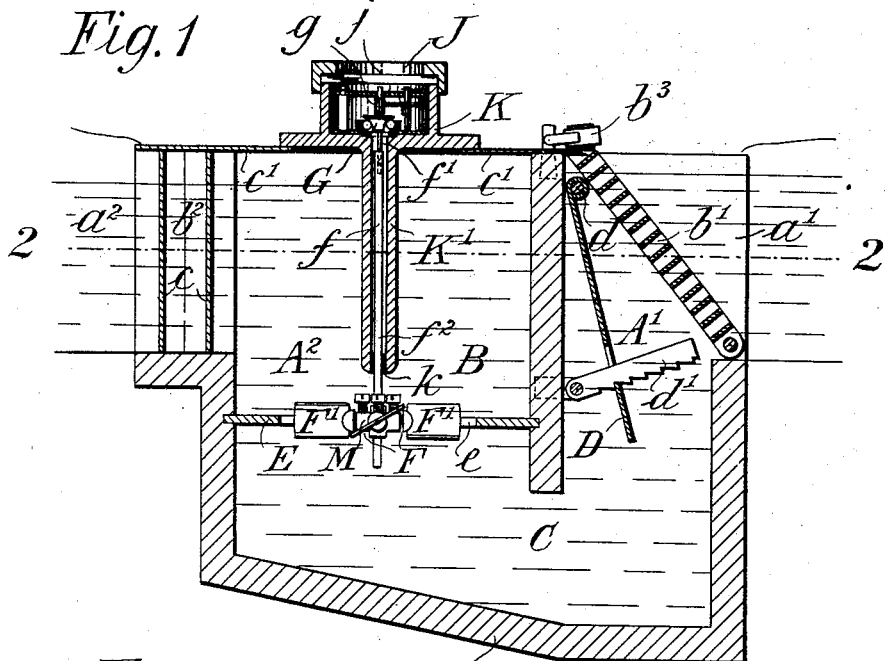
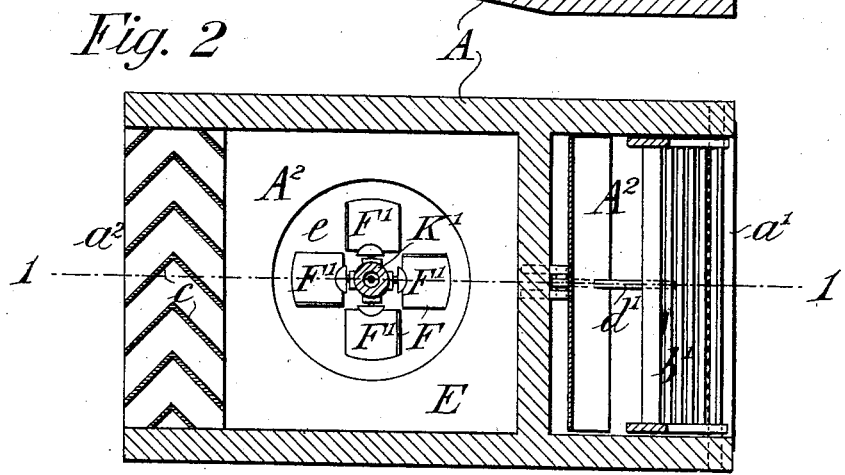
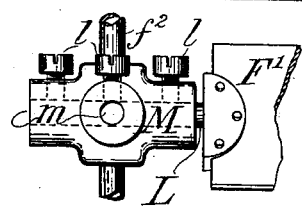

UNITED STATES PATENT OFFICE.

CHARLES JAMES GRANT, OF MILDURA, AND ANTHONY GEORGE MALDON MICHELL, OF MELBOURNE, VICTORIA, AUSTRALIA.

APPARATUS FOR MEASURING WATER FOR IRRIGATION OR SIMILAR PURPOSES.

SPECIFICATION forming part of Letters Patent No. 771,061, dated September 27, 1904.

Application filed May 18, 1904. Serial No. 208,607. (No model.)

*To all whom it may concern:*

Be it known that we, CHARLES JAMES GRANT, civil engineer, residing at Mildura, and ANTHONY GEORGE MALDON MICHELL, civil engineer, residing at 413 Collins street, Melbourne, in the State of Victoria, Australia, subjects of the King of Great Britain, have invented an Apparatus for Measuring Water for Irrigation or Similar Purposes, of which the following is a specification.

This invention relates to apparatus for recording the flow of water supplied in large quantities through surface channels, flumes, or ditches. With this object a chamber or penstock is constructed in an excavation made in the line of the channel and connects the inlet and outlet portions of the channel as an inverted siphon. By this arrangement the recording instrument is enabled to take the form of a current-meter with a vertical axis—a position essential to its sensitiveness and permanent accuracy.

In the accompanying drawings, Figure 1 represents a vertical longitudinal section of the apparatus; Fig. 2, a longitudinal horizontal section on line 2 2 of Fig. 1. Fig. 3 shows a part of Fig. 1 on an enlarged scale.

The penstock A, Figs. 1 and 2, consists of the inlet portion A' and the outlet portion A$^2$, separated by the vertical partition B, which allows communication between the two portions by the passage C at the bottom. The inlet and outlet chambers A' A$^2$ have respectively openings $a'$ $a^2$ corresponding to the inlet and outlet water-channels. The inlet-opening $a'$ may be provided with the screen or grating $b'$ to prevent solid matter likely to obstruct the apparatus from being carried into it, as well as to prevent wilful interference with the action of the machine. For the latter purpose the outlet-opening $a^2$ may also be provided with a grating, as $b^2$, which may be constructed, as shown, of bent plates $c$, of V-section, overlapped, so as to prevent a straight rod or wire from being thrust through them. The top of the chamber A$^2$ may be covered by a plate $c'$. The inlet-chamber may be provided with the sluice-plate D, hinged, as at $d$, and capable of being fixed in various positions, as by the notched lever $d'$, in order to adjust the rate of discharge to any required amount, as shown by the meter hereinafter described. In order to allow of inspection and cleaning, the grating $b'$ may also be hinged and secured by a lock, as $b^3$.

The outlet-chamber A$^2$ is divided by the horizontal partition E, formed with the orifice $e$, preferably circular. In this orifice works the fan F, secured on the vertical spindle $f$, which is suspended on a ball-bearing G at its upper end above the water-level. To deal with large flows, there may be more than one orifice through which the water may pass; but only one will require to be fitted with a fan. A toothed pinion $g$ on an extension of the spindle $f$ drives the clockwork J, whose dial $j$ may be graduated to record the flow in gallons, cubic feet, inches per acre of the area irrigated, or other suitable units. The vertical spindle $f$ is preferably made in two portions, the upper, $f'$, which carries the pinion $g$ and the ball-race, being solid and the lower, $f^2$, formed of a light tube loosely pin-jointed to the upper part $f'$ and rotating in a water-lubricated bearing $k$, of lignum-vitæ, horn, or other suitable material, which is fixed in a downward tubular extension K' of the case K, which holds the clockwork.

In order to allow of adjustment or calibration of the instrument, the separate blades F' of the fan F, as shown in Fig. 3, may be provided with cylindrical stem-pieces L, fitting in the holes $m$ and secured by the screws $l$ in the block M, which is secured to the spindle $f$. By this means the inclination of the blades F' to the axis of rotation may be adjusted until the meter is found to register the flow correctly.

Having now particularly described and ascertained the nature of our said invention and in what manner the same is to be performed, we declare that what we claim is—

1. An apparatus for measuring water consisting of a chamber through which the water is caused to flow, a vertical partition across the chamber terminating short of the bottom thereof and dividing the chamber into an inlet and outlet portion the outlet portion being again divided by a horizontal partition having an orifice therein, and a fan revolving in said orifice on a vertical suspended spindle which transmits the motion of the fan to a clockwork recording mechanism.

2. In a measuring apparatus, a fixed vertical tubular casing containing at its upper end a recording clockwork mechanism and a ball-bearing and at its lower end a journal-bearing, a spindle gearing with the clockwork suspended from the ball-bearing and turning in the journal-bearing, and a fan fixed on the lower end of the spindle.

3. An apparatus for measuring water, consisting of a chamber through which the water is caused to flow, a vertical partition across the chamber terminating short of the bottom thereof and dividing the chamber into an inlet and an outlet portion, said outlet portion being divided by a horizontal partition having an orifice therein, a clockwork recording mechanism, a fan revolving in said orifice, a vertically-suspended spindle connected with said fan and with said mechanism and adapted to transmit the motion of the fan to the mechanism, a series of parallel plates of V-shaped cross-section arranged in said outlet portion, and an adjustable hinged sluice-plate arranged in said inlet portion.

In testimony whereof we have hereunto set our hands in presence of two subscribing witnesses.

CHARLES JAMES GRANT.
ANTHONY GEORGE MALDON MICHELL.

Witnesses:
EDWARD WATERS,
EDWARD WATERS, Junr.